US006655403B2

(12) United States Patent
Mills

(10) Patent No.: US 6,655,403 B2
(45) Date of Patent: Dec. 2, 2003

(54) CONTROLLING FUEL VAPOR VENTING IN A FUEL TANK

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 24 days.

(21) Appl. No.: 10/041,416

(22) Filed: Jan. 8, 2002

(65) Prior Publication Data
US 2003/0127134 A1 Jul. 10, 2003

(51) Int. Cl.[7] .............................................. F16K 24/04
(52) U.S. Cl. .......................... 137/2; 137/202; 137/587
(58) Field of Search ........................... 137/2, 202, 587

(56) References Cited

U.S. PATENT DOCUMENTS 6,336,466 B1 * 1/2002 Ganachaud et al. ......... 137/202
6,532,983 B2 * 3/2003 Ganachaud ................... 137/43
2002/0121300 A1 * 9/2002 Ehrman et al. ............. 137/202

* cited by examiner

Primary Examiner—Gerald A. Michalsky
(74) Attorney, Agent, or Firm—Roger A. Johnston

(57) ABSTRACT

A fuel vapor venting system for fuel tanks having a saddle-shaped upper wall. A vapor vent valve is disposed entirely within the tank in each vapor dome compartment formed by the upper tank wall. The vent valves are interconnected by a conduit passing under the lowest portion of the upper tank wall and a drain valve installed in the lowest point of the conduit. The drain valve may be pressure operated or float operated.

18 Claims, 3 Drawing Sheets

CONTROLLING FUEL VAPOR VENTING IN A FUEL TANK

BACKGROUND OF THE INVENTION

The present invention relates to systems for controlling the venting of fuel vapor from a fuel tank and particularly from an on-board motor vehicle fuel tank. Currently, fuel vapor emission control systems are required on light truck passenger motor vehicles. Fuel tanks for such vehicles are often molded of plastic material and configured to conform around structural members of the vehicle such as stiffener members for the vehicle undercarriage or body floor. This often results in the upper or top wall of the tank having a valley formed therein often running longitudinally with respect to the vehicle chassis and which effectively divides the vapor dome within the tank into two or more compartments when the fuel level is not less than that of the lowest level of the valley.

This compartmentalized vapor dome within the tank has caused problems in providing venting of the fuel vapor from the tank and has resulted in the need for a plurality of vapor vent valves with one valve provided in each separate compartment of the vapor dome.

Where the fuel vapor vent valves are float operated and are installed in the tank externally through access openings in the upper wall of the tank, it has proven costly and cumbersome to provide the interconnection of the plurality of vent valves to the remote vapor storage device such as a charcoal filled canister. Furthermore, where the tank has a trough or valley formed in the upper surface thereof, it has been required to provide draining of the liquid fuel from the vent valves and lines when the fuel level falls below the lowest level of the valley upon withdrawal of fuel from the tank.

Thus, it has been desired to provide a way or means of eliminating the need for access openings in the tank wall to install vent valves and to minimize the number of conduit and interconnections thereof required to provide venting of the compartmentalized vapor domes in the fuel tank and to insure drainage of the liquid fuel from the vent system in order to prevent blocking of vapor flow to the storage canister.

Referring to FIG. 2, a known system has the fuel tank indicated generally at 1 which has an upper wall having an upper level 2 and a lower level 3 such that a separate vapor dome 4 is formed within the tank when the fuel rises above the undersurface of the level 3.

A first vapor vent valve 5 is disposed within the vapor dome 4 adjacent the undersurface of the upper level 2; and, a second vapor vent valve 6 is disposed adjacent the undersurface of the tank top level 3 and the outlets of the respective valves 5, 6 are interconnected by a conduit 7 which passes beneath the undersurface of the lower level 3. A second conduit 12 is connected to conduit 7 through an access opening 8 in the lower level 3 of the upper wall; and, conduit 12 is connected to a vapor storage canister 9 which has an outlet 10 adapted for connection to the air inlet of an engine. The canister 9 typically has a purge air inlet 11 for admitting atmospheric air to purge the canister upon engine startup.

BRIEF SUMMARY OF THE INVENTION

The present invention relates to vapor venting of fuel tanks such as for motor vehicles and particularly relates to fuel tanks having a multilevel upper wall and more particularly to tanks having a valley formed in the upper wall for conforming to structural members of the vehicle and thus having a compartmentalized vapor dome. The present invention provides for vapor vent valving in each compartment of the vapor dome interiorly of the tank to eliminate external hose connections along the outer surface of the tank top. The system of the present invention employs a vapor vent valve in each vapor dome compartment and the vent valves are disposed completely interiorly of the tank with the outlets interconnected; and, a single vapor vent line exits through the upper wall of the tank for connection to a storage canister. The interconnecting lines within the tank include a drain valve disposed at the lowest level of the lines passing under valley formed in the upper tank wall. In one embodiment of the invention the drain valve is a one-way pressure operated valve and in an alternate form the drain valve is float operated.

DETAILED DESCRIPTION OF THE INVENTION

Figure 1:
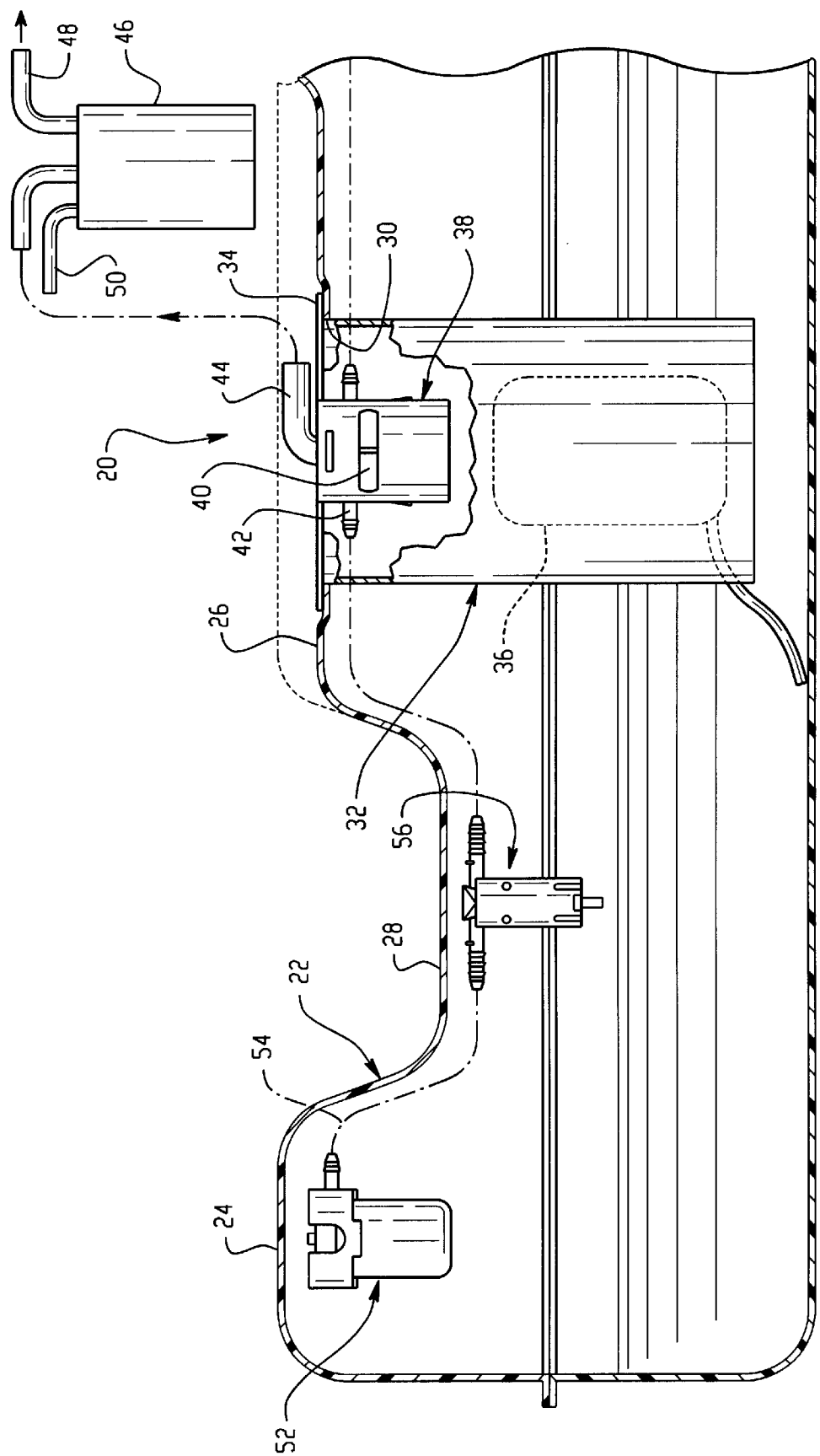
FIG. 1 is a pictorial schematic of a system with a fuel tank having a multilevel upper wall configuration as connected to a vapor storage canister.
Figure 2:
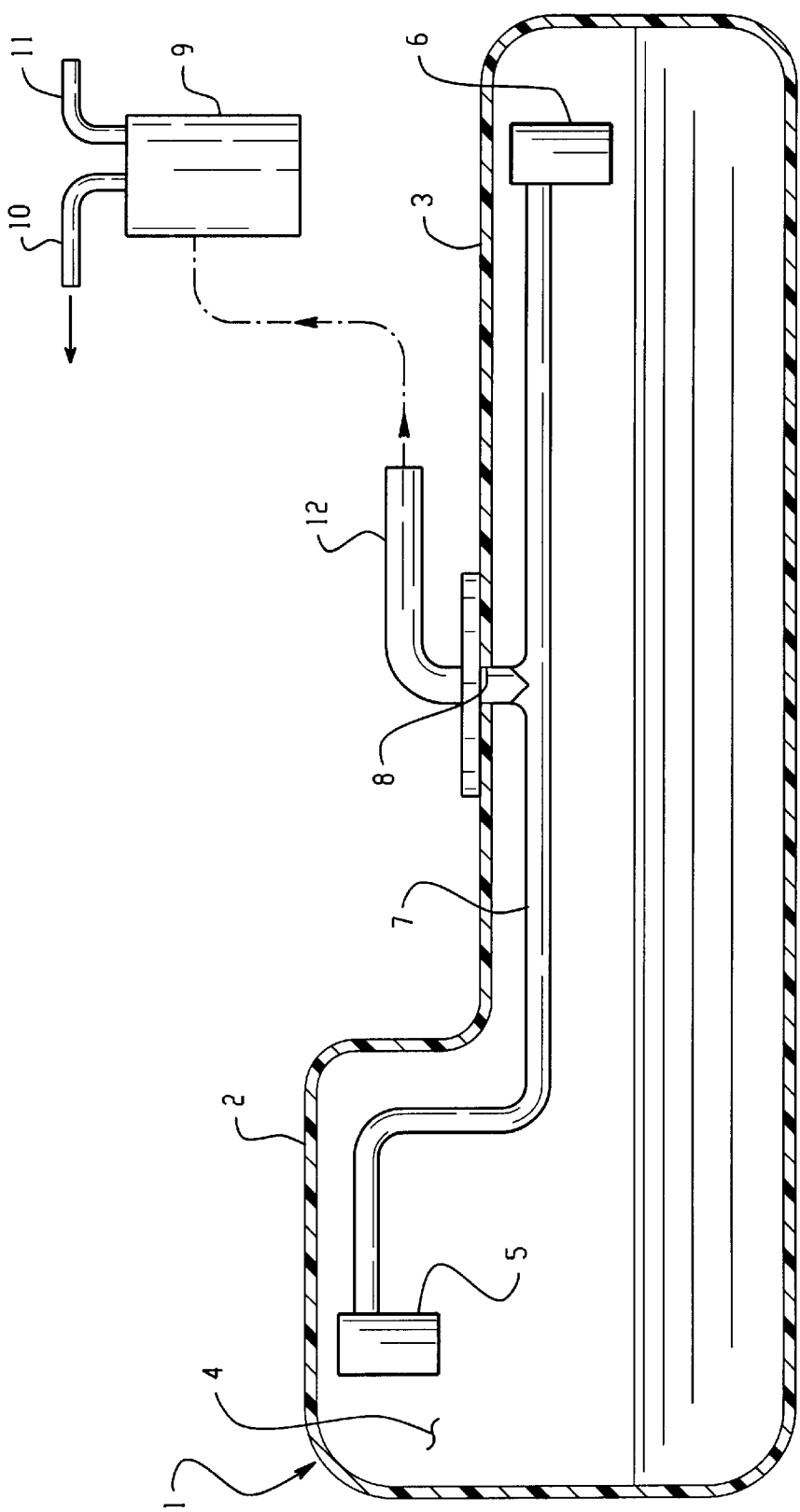
FIG. 2 is a cross-section of a fuel tank with interior vent valves of the prior art.

Referring to FIG. 1, the system of the present invention is indicated generally at 20 and includes a fuel tank indicated generally at 22 having the upper wall thereof formed in a first or highest level 24, a second lower level 26 spaced therefrom and interconnected by a third or lowest level 28 forming a valley between levels 24 and 26 such as for conforming to the undercarriage or under floor structure of a vehicle. It will be understood however, that the first and second levels 24, 26 may alternatively be at the same level as shown in dashed outline in FIG. 1.

An access opening 30 is formed in the second level 26 of the upper wall of the tank and has received therein a module 32 and which is secured about the opening 30 by an annular flange 34 which is sealed about the opening by any suitable expedient, as for example, weldment. The module 32 may include a fuel pump 36 and a vapor vent valve 38 which is preferably of the float operated type, and which has an inlet 40 for receiving fuel vapor therein and at least one outlet 42 which is connected to an externally extending conduit 44 which is also connected to the inlet of storage canister 46. Storage canister 46 has an outlet conduit 48 adapted for connection to the air inlet of an engine and has an atmospheric air inlet 50 for providing atmospheric purge air flow through the canister during engine operation.

A second vapor vent valve, which in the presently preferred practice of the invention is float operated, but may also be pressure operated is disposed in the vapor dome under tank wall portion 24 as denoted by reference numeral 52. The vent valve 52 has an outlet which is connected through conduit or hose 54 to the outlet 42 of vent valve 38. The conduit 54 passes under the lowest level section 28 of the tank upper wall; and, conduit 54 has a drain valve indicated generally at 56 disposed therein and located under the lowest section 28 of the upper tank wall as shown in FIG. 1.

Figure 3:
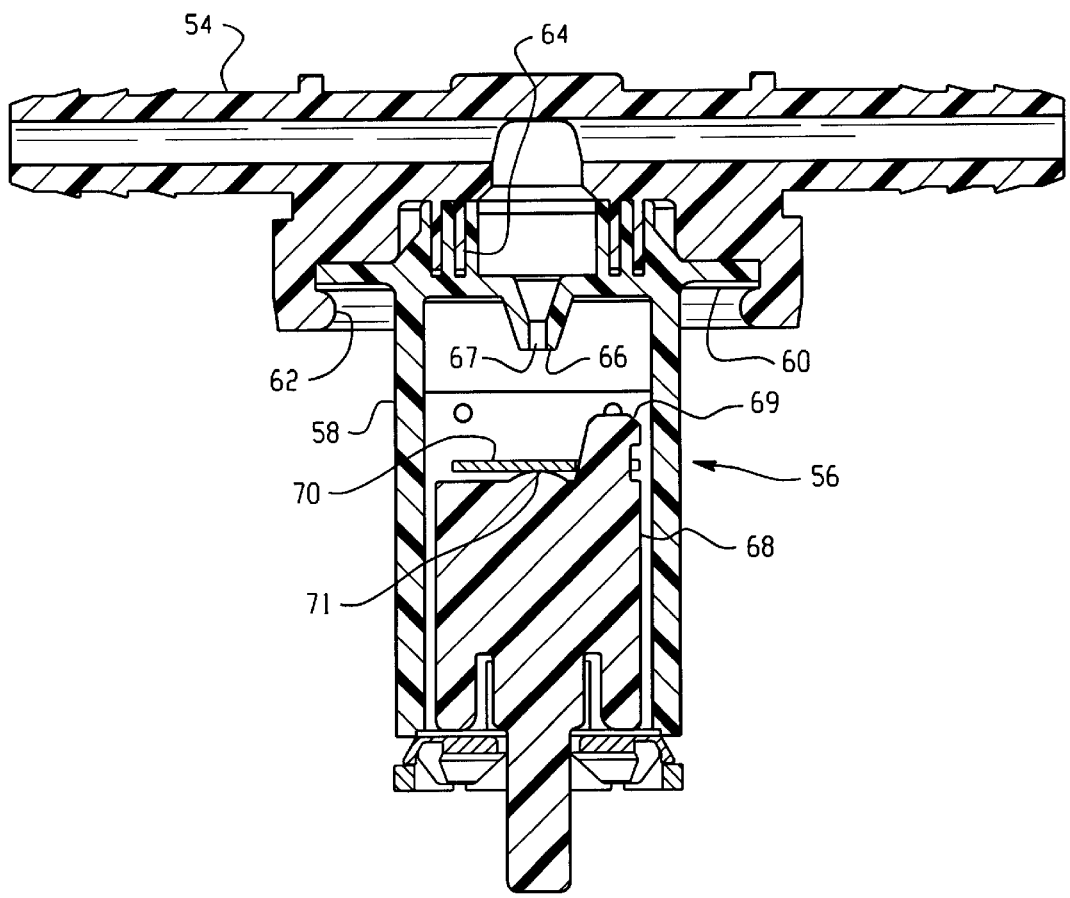
FIG. 3 is a cross-section of a float operated drain valve employed in the present invention; and, FIG. 4 is a cross-section of a one-way drain valve employed in an alternate arrangement of the present invention.

Referring to FIG. 3, the drain valve 56 is shown in one embodiment having a body 58 with an annular outwardly extending flange 60 formed adjacent the upper end thereof which flange is secured to the conduit 54 by snap-locking within an annular receptacle 62 preferably formed internally with a portion of conduit 54 and sealed by labyrinth seal 64. The body has a valve seat 66 disposed therein which communicates with the interior of the conduit 54 via flow passage 67.

A float 68 is slidably disposed within the body and has a flexible membrane valve member 70 provided on the upper end thereof for contacting and closing against valve seat 66 upon the fuel level in the tank rising to the level of the lower surface of the lowest portion 28 of the tank upper wall. Membrane valve number 70 is partially attached to the float 68 about support 69 on the float; and, a centrally located curved surface 71 makes contact with the undersurface of valve member 70 to urge the central region thereof into contact with the valve seat 66.

Figure 4:
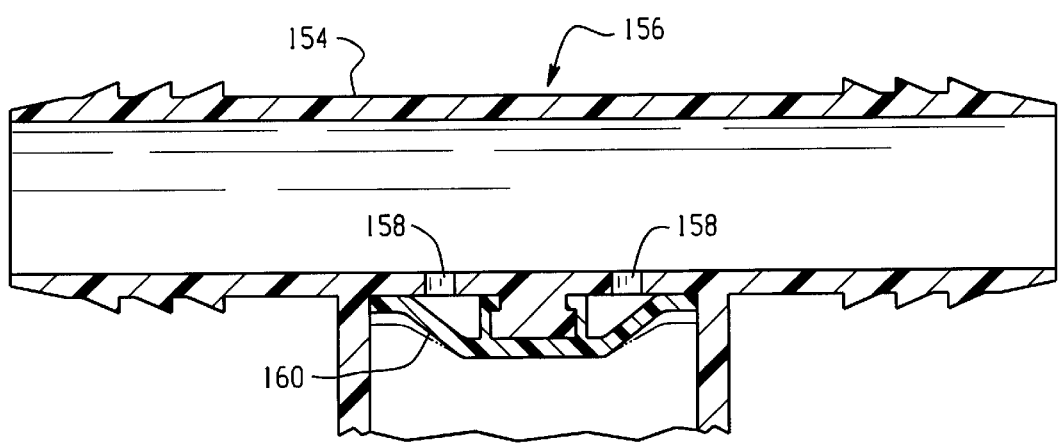

Referring to FIG. 4, an alternate embodiment of the drain valve is illustrated generally at 156 and has a resilient membrane valve member attached to the conduit 154 which has a plurality of drain holes 158 formed therein with the membrane valve member 160 attached thereover on the lower surface of the conduit 154. The membrane 160 is shown in solid outline and FIG. 4 has closed over the drain holes 158 formed in the lower surface of the conduit and is moved to the open position shown in dashed outline in FIG. 4 under the gravitational force or pressure resulting from the weight of liquid fuel accumulating in the conduit 154, thus permitting drainage.

The present invention thus provides a system for venting fuel vapor in a fuel tank having a multilevel upper wall with vapor vent valves disposed completely within the tank and positioned to vent vapor from the various compartments of the vapor dome formed by the contours of the upper wall of the tank and has the outlets of the vent valves interconnected. A drain valve is provided in the upper conduit interconnecting the vent valve outlets at the lowest level of the upper wall of the tank to drain liquid fuel accumulating in the conduit as the tank is refilled and the liquid level rises above the level of the lowest region of the upper wall of the tank. The drain valve comprises a float operated valve in one embodiment and a fluid pressure operated one-way valve in another embodiment.

Although the invention has hereinabove been described with respect to the illustrated embodiments, it will be understood that the invention is capable of modification and variation and is limited only by the following claims.

What is claimed is:

1. A system for venting fuel vapor from a vehicle engine fuel tank of the type having the upper wall thereof configured to a plurality of different levels comprising:
   (a) a first vapor vent valve having an inlet and outlet disposed within the tank at a first of said plurality of levels of the upper wall;
   (b) a second vapor vent valve having an inlet and outlet disposed within the tank at a second of said plurality of levels of the upper wall;
   (c) a storage reservoir disposed remotely from the tank and operably connected for preventing escape to the atmosphere of fuel vapor and adapted to flow vapor to the engine air inlet during engine operation;
   (d) a first conduit connecting the outlet of said first vent valve and the outlet of said second vent valve, wherein said first conduit passes under a third of said plurality of levels lower than said first and second levels;
   (e) a drain valve disposed in said first conduit and operative to drain liquid fuel trapped in the first conduit to the tank when the fuel level therein descends below said third level; and,
   (f) a second conduit connecting said first and second vent valve outlets to said reservoir.

2. The system defined in claim 1, wherein said first and second vent valve are float operated.

3. The system defined in claim 1, wherein said drain valve is float operated.

4. The system defined in claim 1, wherein said tank top has a saddle-like configuration.

5. The system defined in claim 1, wherein said drain valve is a one-way valve.

6. A system for controlling fuel vapor emissions in a motor vehicle comprising:
   (a) a fuel tank having a first portion of the upper wall and a second portion of the upper wall spaced therefrom and disposed at a significantly lower level than said first portion;
   (b) a first float operated vapor vent valve disposed within said tank on said first portion;
   (c) a second float operated vapor vent valve disposed within said tank on said lower level, and a first conduit connecting to the outlet of said first and second vent valve;
   (d) a storage reservoir disposed remotely from the tank for containing fuel vapor during vehicle motor shutdown, said reservoir adapted for connection to the vehicle motor air inlet for providing stored vapor to the air inlet during engine operation; and,
   (e) a second conduit connecting the outlet of said first and second vent valves with said reservoir;
   (f) a drain valve operative to drain liquid fuel from said first conduit when the fuel level in the tank descends below said lower level.

7. The system defined in claim 6, wherein said drain valve is float operated.

8. The system defined in claim 6, wherein said first conduit passes beneath a third portion of the tank at a third level below said lower level and said drain valve is disposed at said third level.

9. A method of controlling fuel vapor emission from a motor vehicle fuel tank having a multilevel upper wall comprising:
   (a) disposing a first vapor vent valve in the uppermost level of said multilevel upper wall and disposing a second vapor vent valve in a second level lower than said uppermost level;
   (b) disposing a conduit under a third lowest level of said upper wall and connecting the outlet of said first vent valve and the outlet of said second vent valve with said conduit and connecting the outlets of said valves to a vapor reservoir remote from the tank with the reservoir adapted for connection to the air inlet of the vehicle motor; and
   (c) disposing a drain valve in said tank at said third lowest level of said upper wall and draining liquid from the said conduit when the fuel level in the tank descends below said third lowest level.

10. The method defined in claim 9, wherein said step of connecting a drain valve in the third lowest level includes disposing said drain valve between said first and second vent valves.

11. The method defined in claim 9, wherein said step of disposing said second valve includes disposing said valve in a valley in the tank top.

12. The method defined in claim 9 wherein said step of disposing a drain valve includes disposing a one-way valve.

13. The method defined in claim 9, wherein said step of disposing a drain valve includes disposing a float operated valve.

14. A method of controlling fuel vapor emission from a motor vehicle fuel tank having a plurality of regions of the upper wall thereof at a higher level and disposed on opposite sides of a lower level region, the method comprising:
   (a) disposing a first vent valve in one of said regions and disposing a second vent valve in another of said regions;
   (b) disposing a conduit under the lower level region of said upper wall and connecting the outlet of said first vent valve and the outlet of said second vent valve with said conduit;
   (c) communicating the outlets of said valves to a vapor reservoir remote from the tank with the reservoir adapted for connection to the air inlet of the motor vehicle; and,
   (d) disposing a drain valve in said tank in said lower level region of the upper wall and draining liquid from the conduit when the fuel level in the tank descends below the said lower level region of the upper wall.

15. The method defined in claim 14, wherein said step of disposing a drain valve includes disposing a float operated valve.

16. A method of controlling fuel vapor emission from a fuel tank having a saddle shaped upper wall forming plural separated vapor dome regions when the fuel level is above the lowest level of the upper wall, comprising:
   (a) disposing a first vent valve in one of said vapor dome regions and disposing a second vent valve in another of said vapor dome regions;
   (b) disposing a conduit under the said lowest level of the upper wall and connecting the outlet of the first and second vent valve to said conduit;
   (c) communicating the outlets of said first and second vent valves with a vapor reservoir remote from the tank; and,
   (d) disposing a drain valve in said tank in the region of the lowest level of the upper wall and draining liquid from said conduit when the fuel level in the tank descends below said lowest level of the tank upper wall.

17. The method defined in claim 16, wherein the step of disposing a drain valve includes disposing a float operated valve.

18. The method defined in claim 17, wherein the step of communicating the outlets of said first and second vent valves includes connecting the conduit to said reservoir.

* * * * *